(Model.) 4 Sheets—Sheet 1.
P. F. HODGES.
KNOTTING MECHANISM FOR GRAIN BINDERS.
No. 286,820. Patented Oct. 16, 1883.
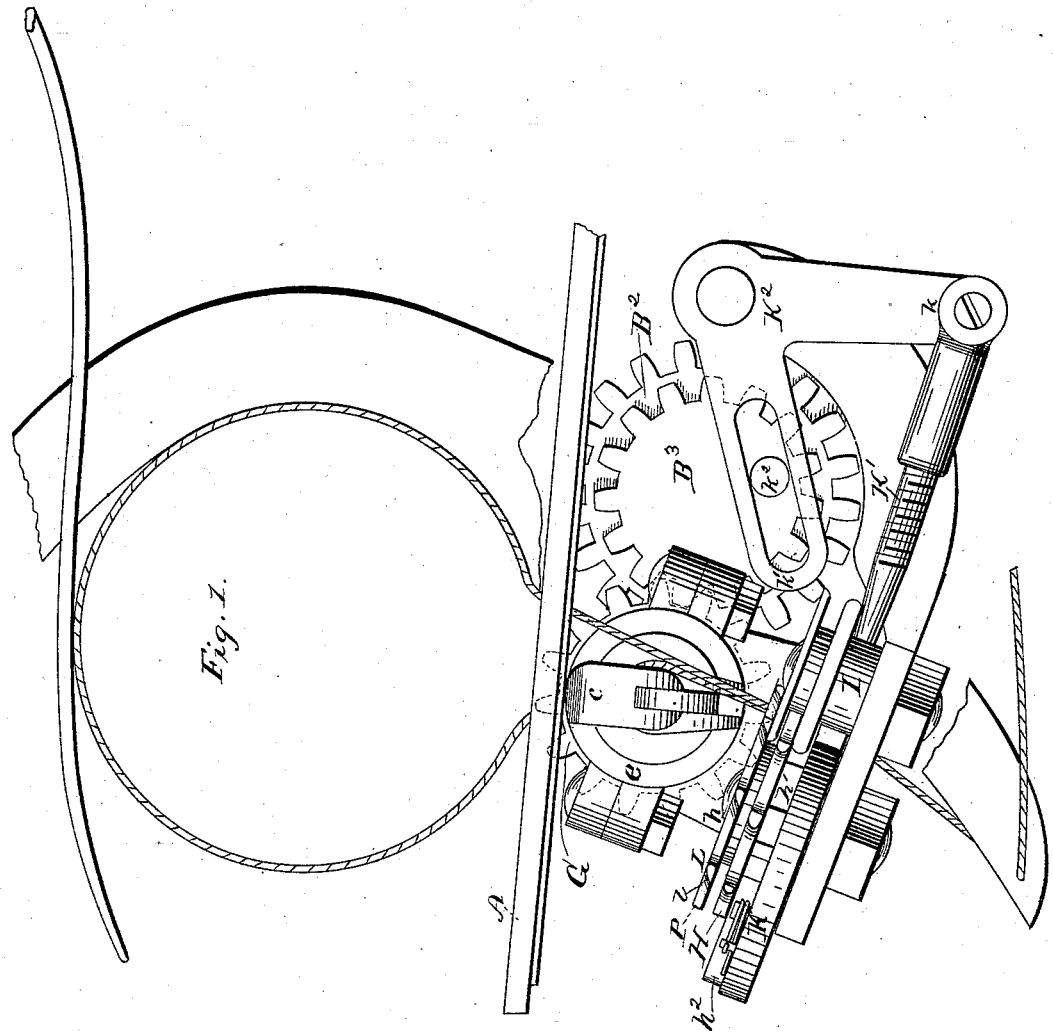
Witnesses
Chas. R. Burr
W. E. Bowen
Inventor
Pliny F. Hodges
by his attorney (Model.)
4 Sheets—Sheet 2.
P. F. HODGES.
KNOTTING MECHANISM FOR GRAIN BINDERS.
No. 286,820. Patented Oct. 16, 1883.
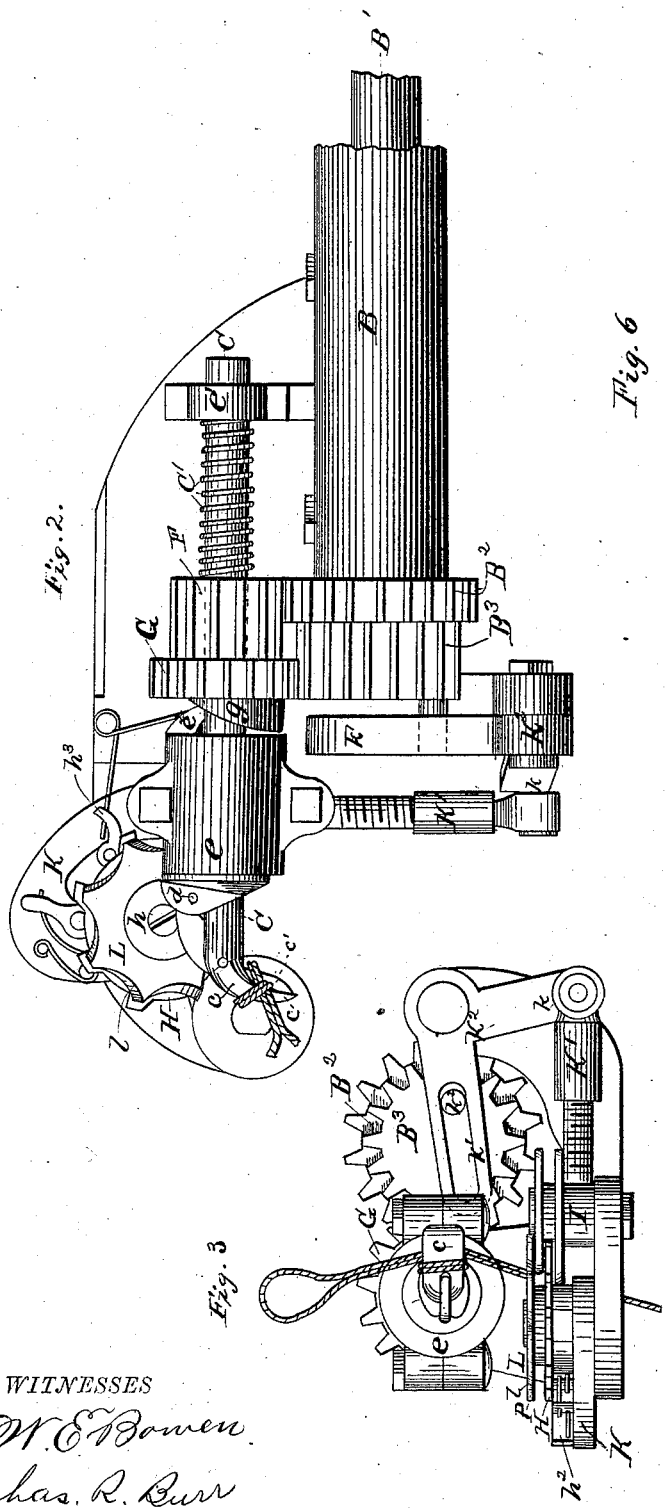
WITNESSES
INVENTOR (Model.)
P. F. HODGES.
KNOTTING MECHANISM FOR GRAIN BINDERS.
No. 286,820. Patented Oct. 16, 1883.
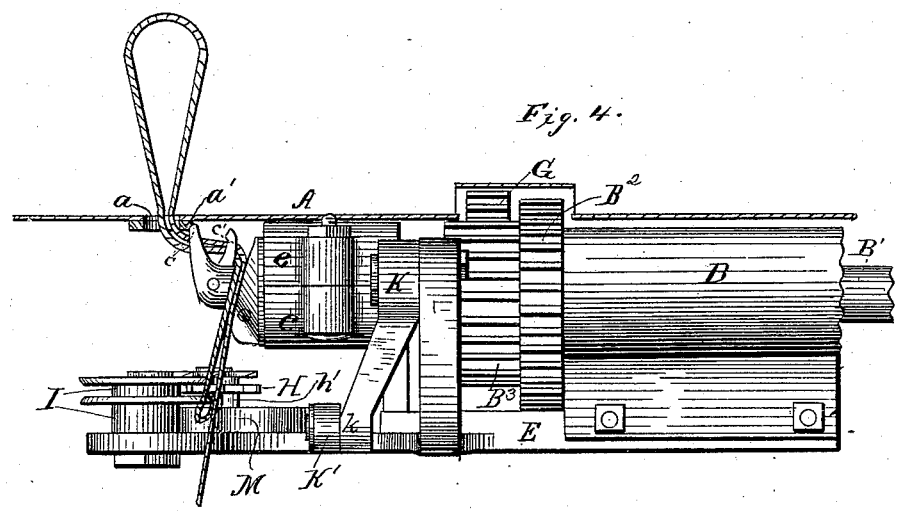
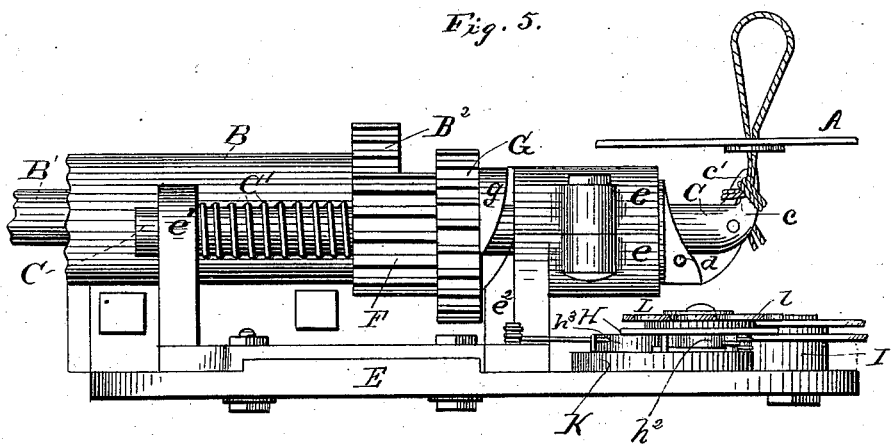
WITNESSES
W. E. Bowen
Chas. R. Burr
INVENTOR (Model.)

P. F. HODGES.
KNOTTING MECHANISM FOR GRAIN BINDERS.

4 Sheets—Sheet 4.

No. 286,820. Patented Oct. 16, 1883.

WITNESSES
Chas. R. Burr
W. E. Bowen

INVENTOR
Oliver F. Hodges
by his attorney

UNITED STATES PATENT OFFICE.

PLINY F. HODGES, OF CHICAGO, ILLINOIS.

KNOTTING MECHANISM FOR GRAIN-BINDERS.

SPECIFICATION forming part of Letters Patent No. 286,820, dated October 16, 1883.

Application filed May 19, 1883. (Model.)

*To all whom it may concern:*

Be it known that I, PLINY F. HODGES, a citizen of the United States, residing at Chicago, in the county of Cook and State of Illinois, have invented certain new and useful Improvements in Knotting Mechanism for Grain-Binders; and I do hereby declare the following to be a full, clear, and exact description of the invention, such as will enable others skilled in the art to which it appertains to make and use the same.

This invention relates to those self-binders for harvesting-machines in which the bundles of grain are bound with twine or cord tied by a knotting mechanism, the principal member of which is a tying-bill.

My improvement consists of certain combinations, distinctly set forth in the claims at the close of this specification.

In order that my invention may be clearly understood, I have illustrated in the annexed drawings, and will proceed to describe, the best form thereof at present known to me.

Figure 7:
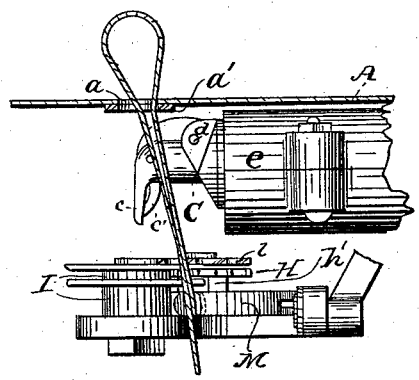
Figure 8:
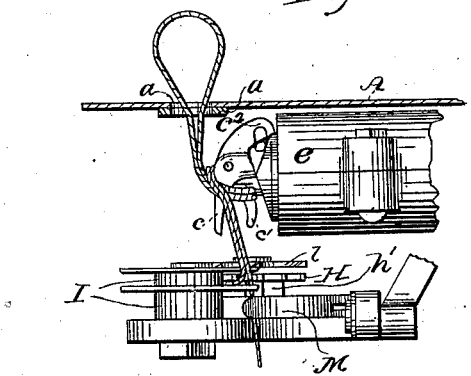

Figure 1 is an end elevation of my improved knotting mechanism, showing also part of the binding-arm, binder-table, and spring presser-arms. Fig. 2 is a plan view of the knotting mechanism. Fig. 3 is an end view thereof. Fig. 4 is a side elevation. Fig. 5 is also a side elevation, showing the side opposite to that illustrated in Fig. 4. Figs. 6 to 8 illustrate details. Fig. 1 is drawn on a somewhat larger scale than the rest.

The same letters of reference indicate identical parts in all the figures.

I have illustrated my improved knotting mechanism as applied at a point under the binder-table A, but desire to remark at the outset that it may be used on self-binders where the knotting mechanism requires to be located above or on the outside of the binder-table, in which case A would be a plate arranged between the binder-table and the knotting mechanism.

B refers to a tubular arm of the main frame of the binder, (the outer end only of said arm being shown,) which supports a shaft, B', which I term the "knotter-operating shaft," since from it are driven the various moving parts of the knotting mechanism. This arm of the binder-frame also supports the knotter-frame E, which is bolted to it in this instance. The end of the cord is held by a cord-holder, which will be described in detail hereinafter, and the cord passes thence through the eye of the binder-arm to the cord-spool. In passing the cord around the grain side of a formed bundle, the binder-arm descends through a cord-slot, $a$, in the binder-table beyond the cord-holder, and the portion of the cord between the eye of the binder-arm and the slot in the binder-table is caused to assume such a position (usually by the action of a tucker, not shown, on the binder-arm) that the cord-holder can seize it. The bundle of grain lies on the binder-table crosswise of slot $a$, and is discharged crosswise by discharging-arms (not shown) in a direction parallel to said slot $a$. I arrange the tying-bill in such a way that on the completion of tying the knot—that is, in its normal position—its bill points toward the cord-slot, so that the loop will free itself thereof by the pull due to the discharge of the bundle, and I cause the tying-bill to make two complete rotations and one endwise reciprocation in forming a knot.

The tying-bill consists of a cylindrical shank or stem, C, terminating at one end in a hook-head, $c$, and a movable jaw, $c'$, which is pivoted to stem C, and forms, in connection with the hook-head $c$, a bill which is opened and closed at the proper times by the oscillations of jaw $c'$ on its pivot. Jaw $c'$ is hung in a slot in stem C, and constructed with a tail provided with a curved slot, $c^2$, which is engaged by a pin, $d$, fixed to a sleeve, D, encircling the stem C. This sleeved portion of stem C is supported in a bearing, $e$, on the knotter-frame E, while the rear of the stem is supported near its outer end in a bearing, $e'$, of such frame. Sleeve D is constructed with a collar, $d'$, fitting a groove in bearing $e$, whereby the sleeve is prevented from moving endwise. A pinion, F, is keyed on the stem of the tying-bill, and is in gear with spur-wheel $B^2$ on the knotter-shaft, pinion F and wheel $B^2$ being so proportioned that the pinion is caused to make two rotations to one of wheel $B^2$. The stem of the tying-bill also carries a loose pinion, G, which is in gear with a spur-wheel, $B^3$, on the knotter-shaft. These wheels G and $B^3$ are of equal diameter, so that one rotation of wheel $B^3$ effects one rotation of pinion G. A cam, $e^2$, is formed on bearing $e$, extending nearly halfway around the stem of the tying-bill, and a reverse but shorter cam, $g$, is formed on the side of loose pinion G facing cam $e^2$. The other side of pinion G is in contact with pinion F, and by the stress of a spiral spring, C', which encircles stem C between pinion F and bearing $e'$, the pinion G is forced into contact with cam $e^2$. Both cams terminate abruptly.

It will be observed that by the action of the gearing, cams, and spiral spring one endwise reciprocation back and forth will be imparted to the tying-bill and its stem during each rotation of the knotter-operating shaft, and while the tying-bill is caused to make two complete rotations. The endwise movement of the tying-bill effected by the cams results in opening the bill for taking in the ends of the cord between the hook-head and the pivoted jaw, and the return endwise movement of the tying-bill produced by the reaction of the spiral spring causes the pivoted jaw to be thrown toward or against the hook-head, so as to seize and hold onto the ends of the cord already between the hook-head and the jaw. How the endwise motions of the tying-bill are timed with reference to its rotations will be explained farther along.

The cord-holder consists of a toothed wheel, H, and a spool, I, the two heads of which overlap a portion of the toothed wheel H. The cord, being placed across the edge of wheel H, between any two of its teeth, is carried by the rotation of such wheel between the heads of the spool I, and firmly clamped between these heads and the wheel H. In order to reduce the friction in forcing the cord between the heads of the spool on each side of the wheel H, and to facilitate the discharge of the fag ends or clippings of the cord, I mount the spool so as to turn loosely on its supporting stud or journal. The wheel H is mounted on a stud, $h$, fixed to the knotter-frame, and its hub is provided with ratchet-teeth $h'$, so that it may be moved step by step at the proper time by pawl $h^2$, which is pivoted to an arm, K, mounted to turn on the supporting-stud $h$ of wheel H. This arm K is connected by pitman K' to the wrist-pin of one arm, $k$, of the bell-crank lever $K^2$, the pitman being preferably made of two parts screwed together, as shown, so that it may be adjusted in length for the purpose of adjusting the position of the toothed wheel H with reference to the spool I. The bell-crank lever is fulcrumed on the knotter-frame, and its arm $k'$ reaches across the face of the spur-wheel $B^3$, and is engaged by eccentric stud $k^2$, which reaches into an elongated slot in said arm $k'$, so that the rotation of wheel $B^3$ will impart a vibrating motion to the bell-crank lever. The throw of the crank-pin is such as to cause the toothed wheel H to be moved a distance equal to that from center to center of two adjacent teeth thereof at each rotation of wheel $B^3$. A pawl, $h^3$, is applied to prevent back motion of the toothed wheel H. A scalloped disk, L, is fastened to the hub of the toothed wheel H of the cord-holder so as to rotate in a plane close to one of the heads of the spool I. The scallops of this disk form a series of cutters, $l$, preferably of hook shape, so that they may operate with a draw cut. These cutters operate in connection with the adjacent head of the spool, ground to an edge for the purpose, something after the fashion of scissors, and are so disposed along the edge of the disk that their cutting-edges are slightly behind and in rear of the front edges of the teeth of wheel H. In consequence of this construction and arrangement of the toothed wheel H and cutter-disk L, the first part of each stepwise movement will force the cord between the heads of the spool, and the cord will be cut during the latter part of this stepwise movement after the end has already been seized by the cord-holder. In order to supply sufficient cord at the end held by the cord-holder for the formation of the loop on the tying-bill, it being understood that the cord ends are held during the entire knotting operation without rendering through the holder or drawing on the cord around the bundle, I provide an oscillating slack-hook, M, located at a point beyond the cord-holder, and adapted to hook over the cord placed across the cord-holder by the binder-arm and hold onto the cord as the binder-arm recedes, so as to double the cord between the cord-holder and the tying-bill. (See Fig. 7.) During the operation of the tying-bill this slack-hook M is thrown back or retracted, so as to withdraw from the loop in the cord (see Fig. 4) and allow the tying-bill to take up this loop or slack in forming the loop for the knot. For the sake of simplicity I have in this instance formed the slack-hook M on the arm K, with the movement of which the movement of the slack-hook coincides in this instance.

The operation of my improved knotting mechanism is as follows: Before starting the machine, the end of the cord is drawn from the eye of the binder-arm and held or fastened at a point above the binder-table. The binding mechanism is then started, the first effect of which is to turn the binder-arm so as to pass its point through slot $a$ and beyond the cord-holder, across the toothed wheel H of which it lays a strand of cord. The knotter-shaft immediately after begins to turn, operating the tying-bill, and presently slack-hook M is retracted beyond the strand of cord, and again projected to hook over said strand at the same time that it is forced by toothed wheel H between the heads of spool I and cut off. The tying-bill having completed its action, the knotter-shaft comes to a standstill, after which the binder-arm is retracted to its elevated position, leaving the end of the cord held by the cord-holder and doubled around the slack-hook. The cut-off end of cord tied by this operation is then pulled from the tying-bill out through the cord-slot $a$, and the machine is ready to begin the tying of bundles of grain. This is the ordinary "threading-up" operation. After a bundle of grain has been packed against the cord, the binder-arm is projected so as to extend the cord around the grain side of the packed bundle and pass it to the cord-holder, in position to be seized thereby. The binder-arm, having so applied the cord, comes to a standstill, and the knotter then begins the operation of forming the knot. At this instant the two ends of the cord are stretched across the stem of the tying-bill, parallel to its bill, one end held rigidly in the holder and the other in the eye of the binder-arm. As the tying-bill rotates, its bill is presently brought to a point at which it extends across the two strands of the cord, when it begins to move endwise backward, drawing on the strands of cord, so as to throw them into an angle between the cord-slot $a$ and the tying-bill, and the same endwise movement opens the pivoted jaw during the first rotation of the tying-bill. The slack-hook M has also been thrown back during this first rotation of the tying-bill, so as to release the loop of cord, to give up slack from this end necessary for the cord to be wound upon the tying-bill, the necessary slack from the other end drawing through the binder-arm. The endwise movement of the tying-bill throws its bill just beyond one edge of the cord-slot $a$, and around this edge of the cord-slot a rib, $a'$, is formed, so that the point of the bill may pass behind this rib and reach beyond the strands of cord, so as to properly take hold of them for winding them into a loop during the second rotation of the tying-bill. After having made about a rotation and a half, the hook-head and pivoted jaw begin to straddle the strands of cord extending to the cord-holder. During the next quarter of the rotation the loop on the tying-bill is completed, the strands between the hook-head and the pivoted jaw are seized by the closing of the jaw, due to the return endwise movement of the tying-bill, effected by the reaction of the spiral spring, and about simultaneously with or a little after the seizing of the strands of cord between the hook-head and pivoted jaw of the tying-bill the strands are cut at the cord-holder by the stepwise movement of the cutter-disk, slightly preceded by the action of the toothed wheel H, forcing the strands held in the eye of the binder-arm into the spool I. Simultaneously with this movement of the cutter-disk and wheel H the slack-hook is thrown forward to hook over the cord between the cord-holder and the eye of the binder-arm. The tying-bill continues to rotate until it has completed its second rotation, leaving its bill in position, pointing toward the cord-slot $a$, when it comes to a standstill. In discharging the bundle the loop of cord is drawn from the tying-bill by the pull on the cord consequent upon such discharge, and the ends of the cord are drawn out of the bill at the same time, the tying-bill moving endwise a little distance against the stress of the spiral spring, so as to open the pivoted jaw sufficiently to release the cord. The binder-arm is retracted or elevated immediately after the tying-bill has completed its action, so as to again stretch the cord across the grain-passage, the end of the cord being held by the cord-holder, from which the cord passes around the slack-hook, as before.

Heretofore a hook or reciprocating bar having a beveled end has been used and the cord doubled around it, the action of said cord-doubling hook or bar, so far as the mere doubling around it of the cord and the releasing of the slack to the knotter was concerned, being identical with the action of my slack-hook; but this cord-doubling hook was associated with a cord-holder which released the end of the cord which had been doubled around the hook during the knot-tying operation, after the loop had been formed, but before the ends were seized ready for the knot to be shed. My slack-hook, on the other hand, is associated with a cord-holder which holds onto the cord during the whole of the knot-tying operation. It is clear that the combination of a cord-doubling hook or bar and a cord-holder which releases the end of the cord during the knot-tying operation is materially different from the combination of such a hook and a cord-holder which holds onto the end of the cord during the whole of the knot-tying operation.

Having thus described my invention, what I claim is—

1. The combination, substantially as before set forth, of a tying-bill, the fast pinion on the stem of the tying-bill, the loose pinion thereon, means for giving said pinion one rotation to two of the fast pinion, the loose pinion carrying a cam, the fixed cam, and the spring, whereby the tying-bill is caused to make two complete rotations to one endwise reciprocation.

2. The combination, substantially as before set forth, of the both rotative and endwise reciprocating tying-bill having a pivoted jaw, and a rotative sleeve around the stem of the tying-bill, a pin on said sleeve engaging a curved slot of the said pivoted jaw.

3. The combination, substantially as before set forth, of a knotter, a cord-holder which holds onto the end of the cord during the whole of the tying operation, and the slack-hook adapted to give up slack during the rotation of the knotter.

4. The combination, substantially as before set forth, of a fixed cord-holder which holds onto the end of the cord during the whole of the tying operation, the slack-hook, and the independent intermittingly projected and retracted binder-arm.

In testimony whereof I affix my signature in presence of two witnesses.

PLINY F. HODGES.

Witnesses:
C. A. NEALE,
E. T. WALKER.